United States Patent
Ma et al.

(10) Patent No.: US 11,159,562 B2
(45) Date of Patent: Oct. 26, 2021

(54) METHOD AND SYSTEM FOR DEFENDING AN HTTP FLOOD ATTACK

(71) Applicant: WANGSU SCIENCE & TECHNOLOGY CO., LTD., Shanghai (CN)

(72) Inventors: Tao Ma, Shanghai (CN); Guang Yang, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 310 days.

(21) Appl. No.: 16/346,691

(22) PCT Filed: Jul. 12, 2018

(86) PCT No.: PCT/CN2018/095434
§ 371 (c)(1),
(2) Date: May 1, 2019

(87) PCT Pub. No.: WO2019/242053
PCT Pub. Date: Dec. 26, 2019

(65) Prior Publication Data
US 2021/0105299 A1    Apr. 8, 2021

(30) Foreign Application Priority Data
Jun. 19, 2018  (CN) .......................... 201810631487.1

(51) Int. Cl.
*H04L 29/06* (2006.01)
(52) U.S. Cl.
CPC ...... *H04L 63/1458* (2013.01); *H04L 63/1416* (2013.01)

(58) Field of Classification Search
CPC .................. H04L 63/1458; H04L 63/1416
See application file for complete search history.

(56) References Cited

U.S. PATENT DOCUMENTS 8,646,064 B1 * 2/2014 Holloway ........... H04L 63/1425
726/12
9,843,596 B1 * 12/2017 Averbuch .............. G06F 21/552
(Continued)

FOREIGN PATENT DOCUMENTS

CN    101888312 A    11/2010
CN    103297437 A    9/2013
(Continued)

OTHER PUBLICATIONS

The World Intellectual Property Organization (WIPO) International Search Report for PCT/CN2018/095434 dated Mar. 18, 2019 9 Pages.
(Continued)

*Primary Examiner* — Joseph P Hirl
*Assistant Examiner* — Stephen T Gundry (57) ABSTRACT

A method for defending an HTTP flood attack includes: determining the number of HTTP requests, transmitted by a protection device, received within each monitored time interval, where the HTTP requests include HTTP requests carried by a single data packet and HTTP requests carried by a plurality of data packets; verifying a target HTTP request after the number of HTTP requests received within any monitored time interval reaches a first threshold, where the target HTTP request includes an HTTP request received after the number of HTTP requests received within any monitored time interval reaches the first threshold; and responding to a verified target HTTP request.

18 Claims, 2 Drawing Sheets

(56) References Cited

U.S. PATENT DOCUMENTS

| | | | |
|---|---|---|---|
| 2004/0172557 A1* | 9/2004 | Nakae | H04L 63/0263 726/22 |
| 2010/0268932 A1 | 10/2010 | Bhattacharjee | |
| 2011/0055921 A1* | 3/2011 | Narayanaswamy | H04L 63/1458 726/22 |
| 2011/0099622 A1 | 4/2011 | Lee et al. | |
| 2011/0107412 A1* | 5/2011 | Lee | H04L 63/1458 726/11 |
| 2012/0174196 A1* | 7/2012 | Bhogavilli | H04L 63/1416 726/5 |
| 2013/0151623 A1* | 6/2013 | Weiser | H04L 65/103 709/205 |
| 2013/0152153 A1* | 6/2013 | Weiser | H04L 65/1006 726/1 |
| 2014/0189867 A1* | 7/2014 | Jung | H04L 63/1458 726/23 |
| 2014/0317738 A1 | 10/2014 | Be'ery et al. | |
| 2015/0096020 A1* | 4/2015 | Adams | H04L 63/10 726/23 |
| 2015/0150123 A1* | 5/2015 | Be'ery | H04L 63/1416 726/22 |
| 2015/0163241 A1* | 6/2015 | Campbell | H04L 63/1425 726/22 |
| 2015/0229669 A1* | 8/2015 | Xin | H04L 67/10 726/23 |
| 2016/0164912 A1 | 6/2016 | Del Fante | |
| 2016/0173526 A1* | 6/2016 | Kasman | H04L 63/1458 726/23 |
| 2017/0180415 A1* | 6/2017 | Jain | H04L 63/1425 |
| 2017/0223049 A1* | 8/2017 | Kuperman | H04L 63/1466 |
| 2017/0257388 A1* | 9/2017 | Addepalli | H04L 63/1458 |
| 2017/0289186 A1* | 10/2017 | Staniford | H04L 63/1425 |
| 2017/0374098 A1* | 12/2017 | Kish | H04L 43/0876 |
| 2018/0034854 A1* | 2/2018 | Gong | H04L 63/0442 |
| 2018/0255094 A1* | 9/2018 | Doron | H04L 63/1416 |
| 2019/0132353 A1* | 5/2019 | Rodniansky | H04L 63/0227 |
| 2019/0334940 A1* | 10/2019 | Bar Noy | H04L 63/20 |

FOREIGN PATENT DOCUMENTS

| | | |
|---|---|---|
| CN | 104079557 A | 10/2014 |
| CN | 104092665 A | 10/2014 |
| CN | 104333529 A | 2/2015 |
| CN | 105323259 A | 2/2016 |
| CN | 105939315 A | 9/2016 |
| CN | 105939326 A | 9/2016 |
| EP | 2293513 A1 | 3/2011 |
| EP | 2854366 A1 | 4/2015 |

OTHER PUBLICATIONS

The China National Intelleectual Property Administration (CNIPA) the China Search Report for 201810631487.1 dated Dec. 16, 2019 5 Pages.

The China National Intelleectual Property Administration (CNIPA) the China Search Report for 201810631487.1 dated Jun. 29, 2020 3 Pages.

The European Patent Office (EPO) the Extended European Search Report for 18906716.8 dated Apr. 20, 2020 9 Pages.

\* cited by examiner

METHOD AND SYSTEM FOR DEFENDING AN HTTP FLOOD ATTACK

CROSS-REFERENCES TO RELATED APPLICATIONS

This application is a national phase entry under 35 U.S.C § 371 of International Application No. PCT/CN2018/095434 filed on Jul. 12, 2018, which claims priority of Chinese Patent Application No. 2018106314871, filed with the State Intellectual Property Office of P. R. China on Jun. 19, 2018, the entire contents of all of which are incorporated herein by reference.

FIELD OF DISCLOSURE

The present disclosure generally relates to the field of computer network security technology and, more particularly, relates to a method and system for defending an HTTP flood attack.

BACKGROUND

The Hypertext Transfer Protocol flood (HTTP flood) attack is a method mainly used for attacking servers. Currently, the method for defending an HTTP flood attack is to set a protection device between a client terminal and a server. After the client terminal establishes a Transmission Control Protocol (TCP) connection with the server, the client terminal may transmit an HTTP request to the server. After obtaining the HTTP request, the protection device verifies the HTTP request, and transmits the HTTP request to the server after the verification is passed. Otherwise, the protection device intercepts the HTTP request to prevent an attacker from transmitting the HTTP request to attack the server.

However, the protection device usually is able to parse out an HTTP request carried only by a single data packet. When the same HTTP request is carried by a plurality of data packets, that is, when the same HTTP request is distributed among a plurality of data packets, the protection device is not able to completely parse these data packets, and thus is unable to parse out a complete HTTP request from these data packets. The protection device usually forwards these unparsable data packets directly to the server. Since an HTTP request comprising a plurality of data packets may be a request containing the attack, it is easy to cause the server to be attacked.

BRIEF SUMMARY OF THE DISCLOSURE

To solve the problems in the existing technologies, the embodiments of the present disclosure provide a method and system for defending an HTTP flood attack. The technical solutions are as follows:

In one aspect, a method for defending an HTTP flood attack is provided. The method is applied to a server, and the method includes:

determining the number of HTTP requests, transmitted by a protection device, received within each monitored time interval, where the HTTP requests include HTTP requests carried by a single data packet and HTTP requests carried by a plurality of data packets;

verifying a target HTTP request after the number of HTTP requests received within any monitored time interval reaches a first threshold, where the target HTTP request includes an HTTP request received after the number of HTTP requests received within any monitored time interval reaches the first threshold; and responding to a verified target HTTP request.

Optionally, verifying the target HTTP request includes:

determining whether the target HTTP request includes verification information;

when the target HTTP request does not include the verification information, transmitting the verification information to a client terminal that transmits the target HTTP request; and when the target HTTP request includes the verification information, verifying whether the verification information is correct.

Optionally, verifying the target HTTP request further includes:

determining the number of target HTTP requests, corresponding to each source address, received within each monitored time interval; and after the number of target HTTP requests corresponding to a same source address reaches a second threshold, discarding a target HTTP request, corresponding to the same source address, received after the number of target HTTP requests corresponding to the same source address reaches the second threshold.

Optionally, after the number of target HTTP requests corresponding to the same source address reaches the second threshold, the method further includes:

transmitting the same source address to the protection device, to allow the protection device to discard the target HTTP request, corresponding to the same source address, received after the number of target HTTP requests corresponding to the same source address reaches the second threshold.

Optionally, verifying the target HTTP request further includes:

determining the number of target HTTP requests, corresponding to each combination of source address and Uniform Resource Locator (URL), received within each monitored time interval; and after the number of target HTTP requests corresponding to a same combination of source address and URL reaches a third threshold, discarding a target HTTP request, corresponding to the same combination of source address and URL, received after the number of target HTTP requests corresponding to the same combination of source address and URL reaches the third threshold.

Optionally, after the number of target HTTP requests corresponding to the same combination of source address and URL reaches the third threshold, the method further includes:

transmitting the same combination of source address and URL to the protection device to allow the protection device to discard the target HTTP request, corresponding to the same combination of source address and URL, received after the number of target HTTP requests corresponding to the same combination of source address and URL reaches the third threshold.

Optionally, verifying the target HTTP request further includes:

when the target HTTP request is an HTTP request carried by a single data packet, determining that the target HTTP request is a legitimate request; and when the target HTTP request is an HTTP request carried by a plurality of data packets, determining whether the target HTTP request includes verification information, if the target HTTP request includes the verification information, verifying whether the verification information is correct, and if the target HTTP request does not include the verification information, transmitting the verification information to a client terminal that transmits the target HTTP request.

Optionally, before verifying the target HTTP request, the method further includes:

receiving one or more data packets carrying the target HTTP request, and parsing the one or more data packets to obtain the target HTTP request;

when the one or more data packets carrying the target HTTP request is a single data packet, using an identifier to mark the target HTTP request; and verifying the target HTTP request further includes:

when the target HTTP request includes the identifier, determining that the target HTTP request is a legitimate request, and when the target HTTP request does not include the identifier, determining whether the target HTTP request includes the verification information, if the target HTTP request includes the verification information, verifying whether the verification information is correct, and if the target HTTP request does not include the verification information, transmitting the verification information to the client terminal that transmits the target HTTP request.

In another aspect, a system for defending an HTTP flood attack is provided. The system includes a protection device and a server, where:

the protection device is configured to receive HTTP requests transmitted by client terminals, and when it is determined that there is an attack, verify HTTP requests carried by a single data packet and transmit HTTP requests carried by a plurality of data packets and verified HTTP requests carried by a single data packet to the server; and the server includes a receiving unit, a determining unit, a verifying unit, and a responding unit, where:

the receiving unit is configured to receive a number of HTTP requests transmitted by the protection device, the determining unit is configured to determine the number of HTTP requests, transmitted by the protection device, received within each monitored time interval, the verifying unit is configured to verify a target HTTP request after the number of HTTP requests received within any monitored time interval reaches a first threshold, where the target HTTP request includes an HTTP request received after the number of HTTP requests received within any monitored time interval reaches the first threshold, and the responding unit is configured to respond to a verified target HTTP request.

Optionally, the verifying unit is specifically configured to:

determine whether the target HTTP request includes verification information;

when the target HTTP request does not include the verification information, transmit the verification information to a client terminal that transmits the target HTTP request; and when the target HTTP request includes the verification information, verify whether the verification information is correct.

Optionally, the verifying unit is further specifically configured to:

determine the number of target HTTP requests, corresponding to each source address, received within each monitored time interval; and after the number of target HTTP requests corresponding to a same source address reaches a second threshold, discard a target HTTP request, corresponding to the same source address, received after the number of target HTTP requests corresponding to the same source address reaches the second threshold.

Optionally, the verifying unit is further configured to:

transmit the same source address to the protection device, to allow the protection device to discard the target HTTP request, corresponding to the same source address, received after the number of target HTTP requests corresponding to the same source address reaches the second threshold.

Optionally, the verifying unit is further specifically configured to:

determine the number of target HTTP requests, corresponding to each combination of source address and URL, received within each monitored time interval; and after the number of target HTTP requests corresponding to a same combination of source address and URL reaches a third threshold, discard a target HTTP request, corresponding to the same combination of source address and URL, received after the number of target HTTP requests corresponding to the same combination of source address and URL reaches the third threshold.

Optionally, the verifying unit is further configured to:

transmit the same combination of source address and URL to the protection device to allow the protection device to discard the target HTTP request, corresponding to the same combination of source address and URL, received after the number of target HTTP requests corresponding to the same combination of source address and URL reaches the third threshold.

Optionally, the verifying unit is further specifically configured to:

when the target HTTP request is an HTTP request carried by a single data packet, determine that the target HTTP request is a legitimate request; and when the target HTTP request is an HTTP request that is carried by a plurality of data packets, determine whether the target HTTP request includes verification information, if the target HTTP request includes the verification information, verify whether the verification information is correct, and if the target request does not include the verification information, transmit the verification information to a client terminal that transmits the target HTTP request.

Optionally, the receiving unit is further configured to:

receive one or more data packets carrying the target HTTP request, and parse the one or more data packets to obtain the target HTTP request, and when the one or more data packets carrying the target HTTP request is a single data packet, use an identifier to mark the target HTTP request; and the verifying unit is further specifically configured to:

when the target HTTP request includes the identifier, determine that the target HTTP request is a legitimate request, and when the target HTTP request does not include the identifier, determine whether the target HTTP request includes the verification information, if the target HTTP request includes the verification information, verify whether the verification information is correct, and if the target HTTP request does not include the verification information, transmit the verification information to the client terminal that transmits the target HTTP request.

In another aspect, a server is provided. The server includes a processor and a memory, where the memory stores at least one instruction, at least one program, a code set, or an instruction set. The at least one instruction, at least one program, a code set, or an instruction set is loaded and executed by the processor to implement the methods for defending an HTTP flood attack as described above.

In the embodiments of the present disclosure, the server has a protection function, and is capable of verifying HTTP requests that cannot be verified by the protection device, i.e., HTTP requests obtained by reassembling a plurality of data packets. On the other hand, the protection device is capable of verifying HTTP requests carried by a single data packet. The server and the protection device may work cooperatively, thereby improving the protection outcome.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

The embodiments of the present disclosure provide a method for defending an HTTP flood attack. The method may be applied to a network architecture shown in FIG. 1. The network architecture includes a client terminal and a protection system, that is, a protection system for an HTTP flood attack. The protection system includes a protection device and a server. The client terminal connects to the protection device and the protection device connects to the server. The client terminal includes a client terminal that transmits normal HTTP requests and an attacker that transmits attack requests. The server may be a server cluster. The protection device receives HTTP requests transmitted to the server by the client terminal and is able to verify HTTP requests carried by a single data packet. When the protection device receives an HTTP request carried by a plurality of data packets and is unable to parse out the complete HTTP request, the protection device forwards the data packets to the server. The server performs data packet reassembly to obtain the complete HTTP request and verifies the reassembled request. The plurality of data packets in the embodiments of the present disclosure refer to at least two data packets. In the embodiments of the present disclosure, the protection system, which comprises the protection device and the server, may verify HTTP requests carried by a single data packet and HTTP requests carried by a plurality of data packets, thereby improving the protection outcome.

Figure 1:
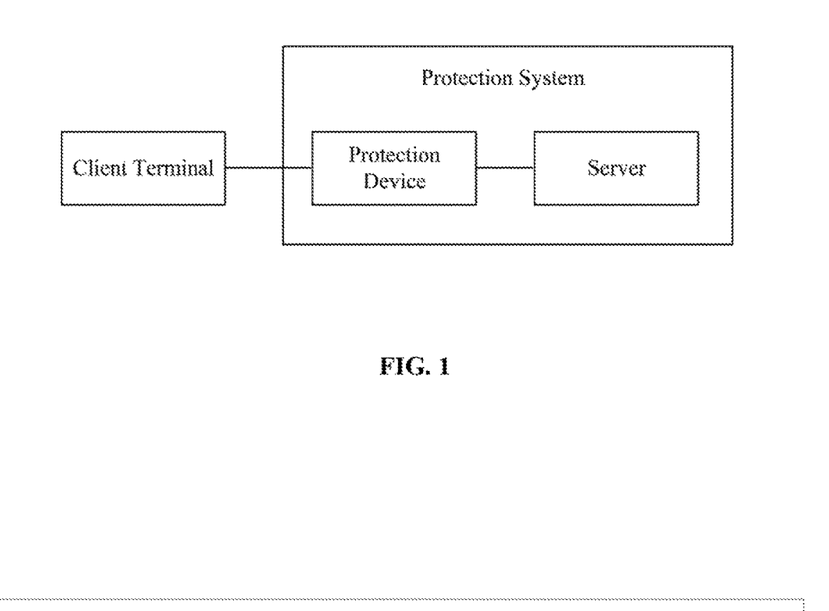
FIG. 1 is a schematic diagram of a network architecture according to some embodiments of the present disclosure.

An HTTP request includes a source address and a Uniform Resource Locator (URL). The source address is used to denote the transmitting source of the HTTP request, and each source address corresponds to one client terminal. The URL is a concise representation of the location and access method of a resource that may be obtained from the Internet, and is the address of a standard resource on the Internet. Each file on the Internet has a unique URL.

When there is no attack, the protection device may not need to verify the security of an HTTP request. That is, the protection device may transmit an HTTP request directly to the server after receiving the HTTP request. The process of determining, by the protection device, whether an attack exists or not includes determining the number of HTTP requests received within each monitored time interval (e.g., 5 seconds). When the number of HTTP requests received within any monitored time interval exceeds a threshold, it may be considered that there is an attack. If the number of HTTP requests received within each monitored time interval does not exceed the threshold, it may be considered that there is no attack. It should be noted that, in the embodiments of the present disclosure, each monitored time interval may be continuous in time, that is, the ending time of the last monitored time interval is the starting time of the next monitored time interval. Or each monitored time interval may be also discontinuous in time.

The protection device receives HTTP requests transmitted to the server by the client terminal(s). The HTTP requests include HTTP requests carried by a single data packet, and HTTP requests carried by a plurality of data packets. When it is determined that there is an attack, the protection device starts to verify a received HTTP request carried by a single data packet, while forwarding an HTTP request carried by a plurality of data packets. The verification process in the protection device includes: the protection device parses an HTTP request carried by a single data packet; when the HTTP request does not include verification information, the protection device transmits the verification information to the client terminal; in response to receiving the verification information, the client terminal re-transmits an HTTP request containing the verification information to the protection device; after receiving the re-transmitted HTTP request, the protection device parses out the verification information included in the HTTP request and performs the verification process; when the verification is passed, the protection device transmits the HTTP request to the server. When an attacker attacks the server, the attacker is generally only in charge of transmitting a large number of requests, but will not receive the verification information transmitted by the protection device or will not conduct a parsing process after receiving the verification information, so that no new HTTP request containing the verification information may be transmitted. An HTTP request that fails to pass the verification by the protection device is a malicious request transmitted by an attacker, which will be discarded and will not be forwarded to the server. An HTTP request verified by the protection device may be initially considered as a normal request and will be forwarded to the server through the protection device. Accordingly, the protection device is capable of intercepting an attack request transmitted by an attacker.

The protection device may handle some simple attacks, such as HTTP requests carried by a single data packet. However, the protection device may not completely parse and process every data packet, and thus may not reassemble a plurality of data packets into a complete HTTP request. On the other hand, the underlying infrastructure of the server transceives the data packets, and, through a complete protocol stack, the server may reassemble a plurality of data packets to obtain a complete HTTP request. Accordingly, the server may verify an HTTP request reassembled from a plurality of data packets. The protection process of the server will be made in detail hereinafter.

Figure 2:
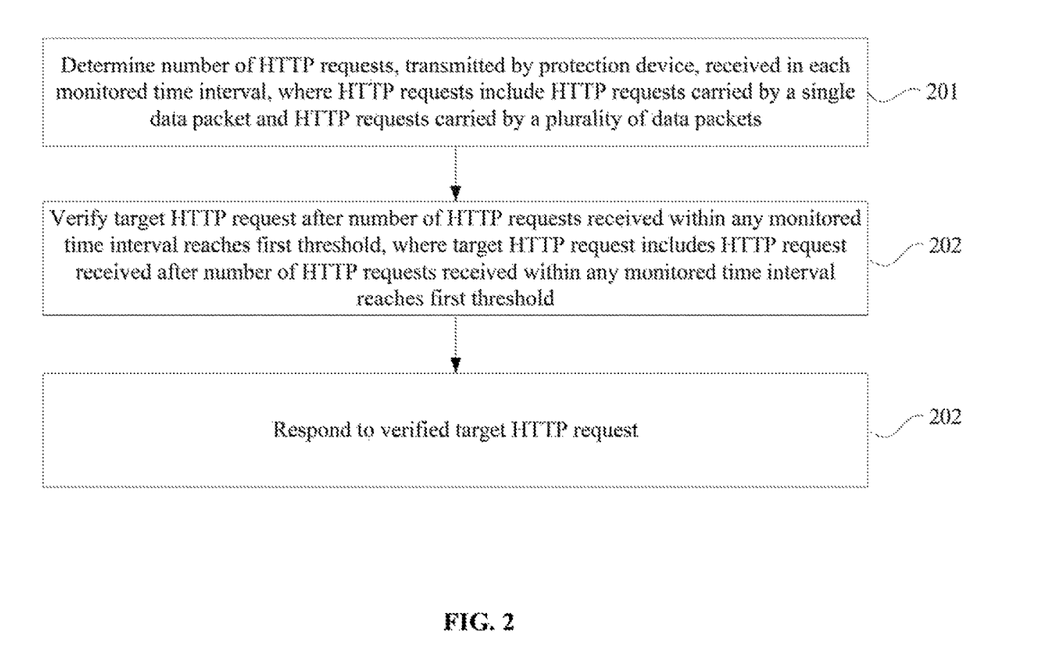
FIG. 2 is a flowchart of a method for defending an HTTP flood attack according to some embodiments of the present disclosure.

FIG. 2 is a flowchart of a method for defending an HTTP flood attack according to some embodiments of the present disclosure. The method may be applied to a server, and the method may specifically include the following steps.

Step 201: Determine the number of HTTP requests, transmitted by the protection device, received within each monitored time interval, where the HTTP requests include HTTP requests carried by a single data packet and HTTP requests carried by a plurality of data packets.

After receiving the data packet(s) transmitted by the protection device, the server parses the data packet(s). The server may parse out a complete HTTP request carried by a single data packet. The server may also parse and reassemble a plurality of data packets according to the protocol stack to obtain a complete HTTP request, so as to further verify an HTTP request that cannot be verified by the protection device.

The server may determine whether an attack exists by determining the number of HTTP requests, transmitted by the protection device, received within each monitored time interval. When the number of HTTP requests received within each monitored time interval is less than a first threshold, it means that there is no attack, and the server may directly respond to each HTTP request without the necessity of verifying a received HTTP request.

Step 202: When the number of HTTP requests received within any monitored time interval reaches the first threshold, verify a target HTTP request, where the target HTTP request includes an HTTP request received after reaching the first threshold.

When the number of HTTP requests received within any monitored time interval reaches the first threshold, it means that there is an attack, and the server starts to verify the received target HTTP requests. Because the HTTP requests, carried by a single data packet, received by the server are legitimate requests that have been verified by the protection device, the number of these legitimate requests is limited, which may not lead the total number of HTTP requests to reach the first threshold. Therefore, when the number of HTTP requests received within a monitored time interval reaches the first threshold, it is usually due to the HTTP requests that have not been verified by the protection device. That is, the number of HTTP requests obtained by reassembling a plurality of data packets is too large. Therefore, when the server verifies a target HTTP request, the server may be able to verify the legitimacy of an HTTP request reassembled from a plurality of data packets.

In the embodiments of the present disclosure, the HTTP requests received after reaching the first threshold are subjected to verification. For example, the first threshold is 5,000. When the number of HTTP requests received within a monitored time interval reaches 5,000, the received $5,001^{st}$ HTTP request will be subjected to verification.

In a specific implementation, it may be further provided that, when the number of HTTP requests received within any monitored time interval reaches the first threshold, any currently received HTTP request that has not been responded to and any HTTP request received after reaching the first threshold may be subjected to verification. For example, when it is found that the number of HTTP requests received within a monitored time interval reaches 5,000, and the currently received $4,999^{th}$ and $5,000^{th}$ HTTP requests have not yet been responded to, the verification process may start from the $4,999^{th}$ HTTP request.

Specifically, the server may verify an HTTP request by using four implementations.

Implementation 1

After the number of HTTP requests received within any monitored time interval reaches the first threshold, determine whether a target HTTP request includes verification information. When the target HTTP request does not include the verification information, transmit the verification information to a client terminal that transmits the target HTTP request. After receiving the verification information, the client terminal re-transmits a target HTTP request that includes the verification information to the server. The protection device receives the re-transmitted target HTTP request transmitted by the client terminal. If the target HTTP request is carried by a single data packet, the request is subjected to verification. After the verification is passed, the target HTTP request is transmitted to the server. If the target HTTP request is carried by a plurality of data packets, the protection device forwards the target HTTP request directly to the server. When the server receives the target HTTP request and determines that the verification information is included in the target HTTP request, the server verifies whether the verification information is correct. If the verification information is correct, the verification is passed.

The process of verifying an HTTP request by the protection device has been described in detail in the previous discussion, and will not be described again here.

Implementation 2

After the number of HTTP requests received within any monitored time interval reaches the first threshold, the number of target HTTP requests, corresponding to each source address, received within each monitored time interval is determined. After the number of target HTTP requests corresponding to a same source address reaches a second threshold, the target HTTP requests, corresponding to the same source address, received after reaching the second threshold is discarded. The discarded target HTTP requests are the requests that have not passed the verification.

The monitored time interval in "determining the number of target HTTP requests, corresponding to each source address, received within each monitored time interval" and the monitored time interval in "determining the number of HTTP requests, transmitted by the protection device, received within each monitored time interval" may or may not be synchronized, and the duration of the two monitored time intervals may be equal or different. When the two monitored time intervals are synchronized, collecting the number of received target HTTP requests corresponding to each source address may be started at the next monitored time interval after the number of HTTP requests reaches the first threshold. When the two monitored time intervals are not synchronized, collecting the number of received target HTTP requests corresponding to each source address may be started right after the number of HTTP requests reaches the first threshold. In this situation, the starting time of the first monitored time interval is the moment when the number of HTTP requests reaches the first threshold. The embodiments of the present disclosure do not specifically limit the starting time and duration of the monitored time intervals used for collecting the number of target HTTP requests corresponding to each source address.

After the number of target HTTP requests corresponding to the same source address reaches the second threshold, the same source address may be transmitted to the protection device, to allow the protection device to discard the target HTTP requests corresponding to the same source address. In a specific implementation process, in addition to directly collecting the number of received HTTP requests, the server may also parse and process the log generated by the server to obtain source addresses with an extremely large number of requests, and notify the protection device of these source addresses, to allow the protection device to intercept the HTTP requests corresponding to these source addresses, thus forming a more comprehensive protection scheme.

Implementation 3

After the number of HTTP requests received within any monitored time interval reaches the first threshold, the number of target HTTP requests, corresponding to each combination of source address and URL, received within each monitored time interval is determined. After the number of target HTTP requests corresponding to a same combination of source address and URL reaches a third threshold, the target HTTP requests, corresponding to the same combination of source address and URL, received after reaching the third threshold are discarded. For example, when the number of HTTP requests, whose source address is A and accessing URL is B, exceeds the third threshold, it means that the combination is a malicious combination and the corresponding HTTP requests are malicious requests. The HTTP requests corresponding to the combination are then discarded.

The monitored time interval in the present implementation may be the same as, or different from, the monitored time interval in Implementation 2.

After the number of target HTTP requests corresponding to the same combination of source address and URL reaches the third threshold, the same combination of source address and URL may be transmitted to the protection device, to allow the protection device to discard the target HTTP requests corresponding to the same combination of source address and URL. That is, when the protection device receives an HTTP request and determines that the combination of the source address and the to-be-accessed URL of the HTTP request belongs to the malicious combinations reported by the server, the HTTP request is discarded.

Implementation 4

Since the HTTP requests carried by a single data packet have been verified by the protection device as legitimate requests, after the number of HTTP requests received within a monitored time interval reaches the first threshold, the process of verifying a target HTTP request may include: when the target HTTP request is an HTTP request carried by a single data packet, determining that the target HTTP request is a legitimate request; when the target HTTP request is an HTTP request carried by a plurality of data packets, determining whether the target HTTP request includes verification information; if the target HTTP request includes the verification information, verifying whether the verification information is correct; and if the target HTTP request does not include the verification information, transmitting the verification information to a client terminal that transmits the target HTTP request.

After receiving the verification information, the client terminal re-transmits a target HTTP request that contains the verification information to the server, and the protection device receives the re-transmitted target HTTP request. Since the target HTTP request is an HTTP request carried by a plurality of data packets, the protection device directly forwards the target HTTP request to the server after receiving the target HTTP request. When the server receives the target HTTP request and determines that the verification information is included in the target HTTP request, the server verifies whether the verification information is correct. If the verification information is correct, the verification is passed.

In the disclosed implementation, after determining that there is an attack, the server only verifies, by transmitting the verification information, the target HTTP requests carried by a plurality of data packets. This may reduce the number of times that the server processes the requests, while also allowing a client terminal, which uses a single data packet to transmit an HTTP request, to get a quicker response from the server.

In a specific implementation, after the number of HTTP requests received within any monitored time interval reaches the first threshold, the data packet(s) carrying the target HTTP request is received and parsed to obtain the target HTTP request. When the data packet(s) carrying the target HTTP request is a single data packet, the target HTTP request is marked with an identifier. In the process of verifying the target HTTP request, when the target HTTP request includes the identifier, it means that the target HTTP request is an HTTP request carried by a single data packet, and it may be determined that the target HTTP request is a legitimate request. When the target HTTP request does not include the identifier, it means that the target HTTP request is an HTTP request carried by a plurality of data packets. It may be then determined whether the target HTTP request includes the verification information. If the target HTTP request includes the verification information, verify whether the verification information is correct. If the target HTTP request does not include the verification information, transmit the verification information to the client terminal that transmits the target HTTP request.

In distinguishing the HTTP requests carried by a single data packet and the HTTP requests carried by a plurality of data packets, it may be also possible to mark the requests with different identifiers. That is, after receiving the data packet(s) carrying the target HTTP request and parsing the data packet(s) to obtain the target HTTP request, when the data packet(s) carrying the target HTTP request is a single data packet, a first identifier is used to mark the target HTTP request. When the data packet(s) carrying the target HTTP request is a plurality of data packets, a second identifier is used to mark the target HTTP request. When verifying the target HTTP request, the HTTP request carried by a single data packet and the HTTP request carried by a plurality of data packets may be distinguished according to the first identifier and the second identifier.

It should be noted that the above-described four implementations may be implemented independently or in combination with each other. For example, Implementation 1 and Implementation 2 may be used at the same time, or Implementation 1 and Implementation 3 may be used at the same time. When Implementation 1 and Implementation 2 are used at the same time, through Implementation 2, HTTP requests that do not meet the requirements may be discarded, while the HTTP requests that are not discarded may be further verified by the approach of Implementation 1. For another example, Implementation 2 and Implementation 4 may be used at the same time, or Implementation 3 and Implementation 4 may be used at the same time. Through the combinations of various implementations, the protection outcome and protection efficiency of the server may be improved at the same time.

Step 203: Respond to a verified target HTTP request.

For a verified target HTTP request, the server responds to the request, that is, the server transmits the response information corresponding to the target HTTP request to the client terminal.

In a specific implementation, the protection device may also transmit an incomplete HTTP request included merely in a single data packet to the server. If the server can parse out the incomplete HTTP request, the server may verify or respond to the incomplete HTTP request. If the server cannot parse out the incomplete HTTP request, the HTTP request may be discarded.

In the embodiments of the present disclosure, the server has a protection function, and is capable of verifying HTTP requests that cannot be verified by the protection device, i.e., HTTP requests obtained by reassembling a plurality of data packets. On the other hand, the protection device is capable of verifying HTTP requests carried by a single data packet. The server and the protection device may work cooperatively, thereby improving the protection outcome.

The following is a detailed description of the structure of the server in the protection system according to some embodiments of the present disclosure.

Figure 3:
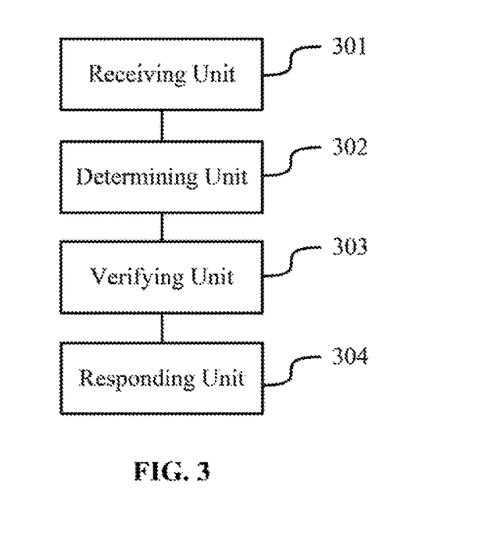
FIG. 3 is a structural block diagram of a server according to some embodiments of the present disclosure.

FIG. 3 is a structural block diagram of a server according to some embodiments of the present disclosure. The server may specifically include a receiving unit 301, a determining unit 302, a verifying unit 303, and a responding unit 304.

The receiving unit 301 is configured to receive a number of HTTP requests transmitted by the protection device, where the HTTP requests transmitted by the protection device includes HTTP requests carried by a single data packet and HTTP requests carried by a plurality of data packets.

The determining unit 302 is configured to determine the number of HTTP requests, transmitted by the protection device, received within each monitored time interval.

The verifying unit 303 is configured to verify a target HTTP request after the number of HTTP requests received within any monitored time interval reaches a first threshold, where the target HTTP request includes an HTTP request received after the number of HTTP requests received within any monitored time interval reaches the first threshold.

The responding unit 304 is configured to respond to a verified target HTTP request.

Preferably, the verifying unit 303 is specifically configured to:

determine whether the target HTTP request includes verification information;

when the target HTTP request does not include the verification information, transmit the verification information to a client terminal that transmits the target HTTP request; and when the target HTTP request includes the verification information, verify whether the verification information is correct.

Preferably, the verifying unit 303 is further specifically configured to:

determine the number of target HTTP requests, corresponding to each source address, received within each monitored time interval; and after the number of target HTTP requests corresponding to a same source address reaches a second threshold, discard a target HTTP request, corresponding to the same source address, received after the number of target HTTP requests corresponding to the same source address reaches the second threshold.

Preferably, the verifying unit 303 is further configured to:
transmit the same source address to the protection device, to allow the protection device to discard the target HTTP request, corresponding to the same source address, received after the number of target HTTP requests corresponding to the same source address reaches the second threshold.

Preferably, the verifying unit 303 is further specifically configured to:

determine the number of target HTTP requests, corresponding to each combination of source address and URL, received within each monitored time interval; and after the number of target HTTP requests corresponding to a same combination of source address and URL reaches a third threshold, discard a target HTTP request, corresponding to the same combination of source address and URL, received after the number of target HTTP requests corresponding to the same combination of source address and URL reaches the third threshold.

Preferably, the verifying unit 303 is further configured to:
transmit the same combination of source address and URL to the protection device, to allow the protection device to discard the target HTTP request, corresponding to the same combination of source address and URL, received after the number of target HTTP requests corresponding to the same combination of source address and URL reaches the third threshold.

Preferably, the verifying unit 303 is further specifically configured to:

when the target HTTP request is an HTTP request carried by a single data packet, determine that the target HTTP request is a legitimate request; and when the target HTTP request is an HTTP request carried by a plurality of data packets, determine whether the target HTTP request includes verification information, if the target HTTP request includes the verification information, verify whether the verification information is correct, and if the target request does not include the verification information, transmit the verification information to a client terminal that transmits the target HTTP request.

Preferably, the receiving unit 301 is further configured to: receive data packet(s) carrying the target HTTP request, and parse the data packet(s) to obtain the target HTTP request; and use an identifier to mark the target HTTP request when the data packet(s) carrying the target HTTP request is a single data packet.

Correspondingly, the verifying unit 303 is further specifically configured to: when the target HTTP request includes the identifier, determine that the target HTTP request is a legitimate request, when the target HTTP request does not include the identifier, determine whether the target HTTP request includes the verification information, if the target HTTP request includes the verification information, verify whether the verification information is correct, and if the target HTTP request does not include the verification information, transmit the verification information to the client terminal that transmits the target HTTP request.

In the embodiments of the present disclosure, the server has a protection function, and is capable of verifying HTTP requests that cannot be verified by the protection device, i.e., HTTP requests obtained by reassembling a plurality of data packets. On the other hand, the protection device is capable of verifying HTTP requests carried by a single data packet. The server and the protection device may work cooperatively, thereby improving the protection outcome.

It should be noted that, when enforcing the protection, the servers for defending an HTTP flood attack provided by the above embodiments are illustrated merely by way of example of the foregoing division of the functional modules.

In real applications, the foregoing functions may be allocated into and implemented by different functional modules according to the needs. That is, the internal structure of a server may be divided into different functional modules to complete all or part of the above-described functions. In addition, the servers provided by the foregoing embodiments and the foregoing methods for defending an HTTP flood attack are attributed to the same concept. Accordingly, for the specific implementation process of the servers, the embodiments for the methods may be referred to, details of which will not be described again here.

Figure 4:
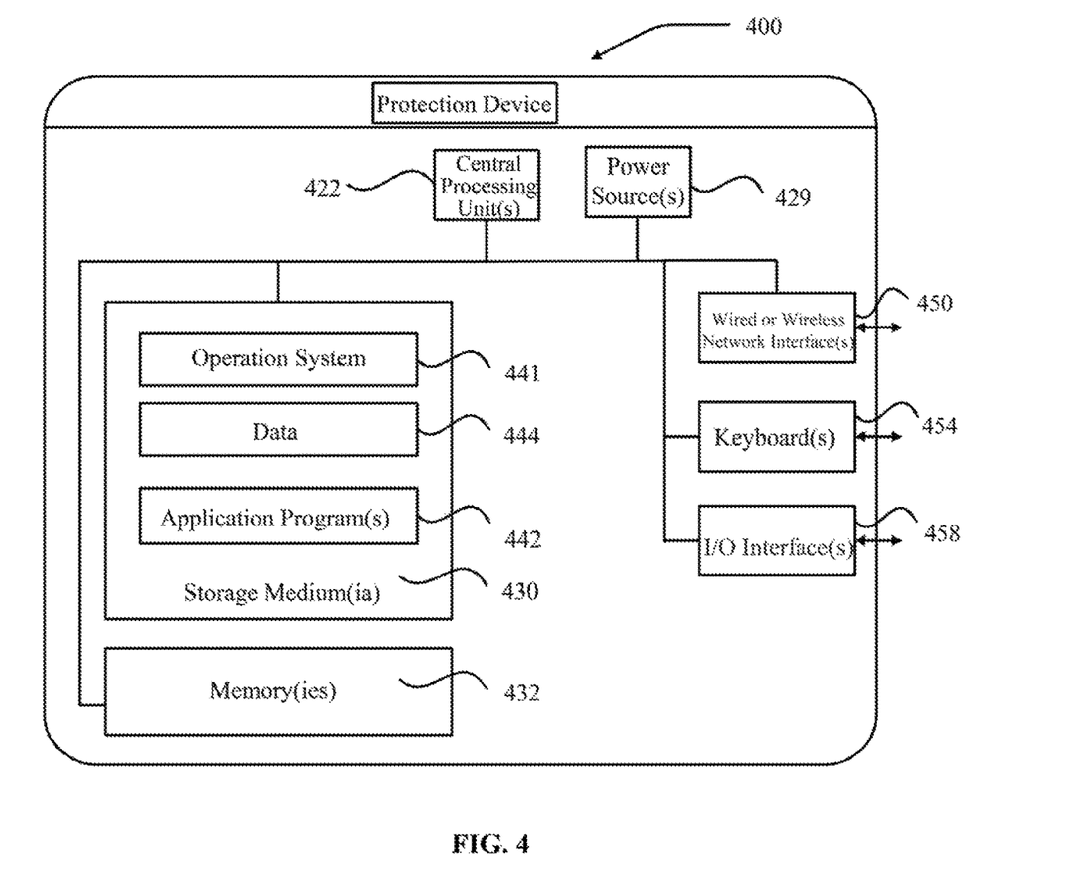
FIG. 4 is a schematic structural diagram of a server according to some embodiments of the present disclosure.

FIG. 4 is a schematic structural diagram of a server according to some embodiments of the present disclosure. The server 400 may vary considerably depending on the configuration or performance, and may include one or more central processing units 422 (e.g., one or more processors) and memories 432, one or more storage media 430 (e.g., one or one mass storage devices) for storing application programs 442 or data 444. Here, the memories 432 and the storage media 430 may be a volatile storage device or a non-volatile storage device. The programs stored on the storage media 430 may include one or more modules (not shown), each of which may include a series of operating instructions for the server. Further, the central processing units 422 may be configured to communicate with the storage media 430, and execute, on the server 400, a series of operating instructions stored in the storage media 430.

The server 400 may further include one or more power sources 429, one or more wired or wireless network interfaces 450, one or more input and output interfaces 458, one or more keyboards 454, and/or one or more operating systems 441, such as Windows Server™, Mac OS X™, Unix™, Linux™, FreeBSD™, and the like.

The server 400 may include a memory and one or more programs, where the one or more programs are stored in the memory and configured to be executed by one or more processors to implement the one or more programs that include instructions configured to perform the protection/defending methods described above.

A person skilled in the art may understand that all or part of the steps of the above embodiments may take the form of hardware implementation or the form of implementation of programs for instructing relevant hardware. The programs may be stored in a computer-readable storage medium. The storage medium may be a read-only memory, a magnetic disk, or an optical disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for defending an HTTP flood attack, the method being applied to a server, and the method comprising:

determining a number of HTTP requests, transmitted by a protection device, received within each monitored time interval, wherein the HTTP requests include HTTP requests carried by a single data packet and HTTP requests carried by a plurality of data packets, and the HTTP requests carried by a single data packet are verified by the protection device;

verifying a target HTTP request after the number of HTTP requests received within any monitored time interval reaches a first threshold, wherein the target HTTP request includes an HTTP request received after the number of HTTP requests received within any monitored time interval reaches the first threshold, the target HTTP request is an HTTP request reassembled from a plurality of data packets or an incomplete HTTP request included merely in a single data packet and the target HTTP request is an HTTP request that cannot be verified by the protection device; and responding to a verified target HTTP request.

2. The method according to claim 1, wherein verifying the target HTTP request further includes:

determining whether the target HTTP request includes verification information;

when the target HTTP request does not include the verification information, transmitting the verification information to a client terminal that transmits the target HTTP request; and when the target HTTP request includes the verification information, verifying whether the verification information is correct.

3. The method according to claim 1, wherein verifying the target HTTP request further includes:

determining the number of target HTTP requests, corresponding to each source address, received within each monitored time interval; and after the number of target HTTP requests corresponding to a same source address reaches a second threshold, discarding a target HTTP request, corresponding to the same source address, received after the number of target HTTP requests corresponding to the same source address reaches the second threshold.

4. The method according to claim 3, after the number of target HTTP requests corresponding to the same source address reaches the second threshold, the method further includes:

transmitting the same source address to the protection device, to allow the protection device to discard the target HTTP request, corresponding to the same source address, received after the number of target HTTP requests corresponding to the same source address reaches the second threshold.

5. The method according to claim 1, wherein verifying the target HTTP request further includes:

determining the number of target HTTP requests, corresponding to each combination of source address and Uniform Resource Locator (URL), received within each monitored time interval; and after the number of target HTTP requests corresponding to a same combination of source address and URL reaches a third threshold, discarding a target HTTP request, corresponding to the same combination of source address and URL, received after the number of target HTTP requests corresponding to the same combination of source address and URL reaches the third threshold.

6. The method according to claim 5, after the number of target HTTP requests corresponding to the same combination of source address and URL reaches the third threshold, the method further includes:

transmitting the same combination of source address and URL to the protection device to allow the protection device to discard the target HTTP request, corresponding to the same combination of source address and URL, received after the number of target HTTP requests corresponding to the same combination of source address and URL reaches the third threshold.

7. The method according to claim 1, wherein verifying the target HTTP request further includes:
- when the target HTTP request is an HTTP request carried by a single data packet, determining that the target HTTP request is a legitimate request; and
- when the target HTTP request is an HTTP request carried by a plurality of data packets, determining whether the target HTTP request includes verification information, if the target HTTP request includes the verification information, verifying whether the verification information is correct, and if the target HTTP request does not include the verification information, transmitting the verification information to a client terminal that transmits the target HTTP request.

8. The method according to claim 7, before verifying the target HTTP request, the method further includes:
- receiving one or more data packets carrying the target HTTP request, and parsing the one or more data packets to obtain the target HTTP request;
- when the one or more data packets carrying the target HTTP request is a single data packet, using an identifier to mark the target HTTP request; and
- wherein verifying the target HTTP request further includes:
  - when the target HTTP request includes the identifier, determining that the target HTTP request is a legitimate request, and
  - when the target HTTP request does not include the identifier, determining whether the target HTTP request includes the verification information, if the target HTTP request includes the verification information, verifying whether the verification information is correct, and if the target HTTP request does not include the verification information, transmitting the verification information to the client terminal that transmits the target HTTP request.

9. The method according to claim 1, wherein verifying a target HTTP request after the number of HTTP requests received within any monitored time interval reaches a first threshold, comprising:
- parsing and reassembling a plurality of data packets according to a protocol stack to obtain a complete HTTP request;
- verifying the target HTTP request reassembled from a plurality of data packets after the number of HTTP requests received within any monitored time interval reaches a first threshold.

10. A system for defending an HTTP flood attack, comprising a protection device and a server, wherein:
- the protection device includes a processor, wherein:
- the processor of the protection device is configured to receive HTTP requests transmitted by client terminals, and when it is determined that there is an attack, verify HTTP requests carried by a single data packet and transmit HTTP requests carried by a plurality of data packets and verified HTTP requests carried by a single data packet to the server; and
- the server includes a receiving unit, a determining unit, a verifying unit, and a responding unit, wherein:
- the receiving unit is configured to receive a number of HTTP requests transmitted by the protection device,
- the determining unit is configured to determine the number of HTTP requests, transmitted by the protection device, received within each monitored time interval,
- the verifying unit is configured to verify a target HTTP request after the number of HTTP requests received within any monitored time interval reaches a first threshold, wherein the target HTTP request includes an HTTP request received after the number of HTTP requests received within any monitored time interval reaches the first threshold, the target HTTP request is an HTTP request reassembled from a plurality of data packets or an incomplete HTTP request included merely in a single data packet and the target HTTP request is an HTTP request that cannot be verified by the protection device, and
- the responding unit is configured to respond to a verified target HTTP request.

11. The system according to claim 10, wherein the verifying unit is further configured to:
- determine whether the target HTTP request includes verification information;
- when the target HTTP request does not include the verification information, transmit the verification information to a client terminal that transmits the target HTTP request; and
- when the target HTTP request includes the verification information, verify whether the verification information is correct.

12. The system according to claim 10, wherein the verifying unit is further configured to:
- determine the number of target HTTP requests, corresponding to each source address, received within each monitored time interval; and
- after the number of target HTTP requests corresponding to a same source address reaches a second threshold, discard a target HTTP request, corresponding to the same source address, received after the number of target HTTP requests corresponding to the same source address reaches the second threshold.

13. The system according to claim 12, wherein the verifying unit is further configured to:
- transmit the same source address to the protection device, to allow the protection device to discard the target HTTP request, corresponding to the same source address, received after the number of target HTTP requests corresponding to the same source address reaches the second threshold.

14. The system according to claim 10, wherein the verifying unit is further configured to:
- determine the number of target HTTP requests, corresponding to each combination of source address and URL, received within each monitored time interval; and
- after the number of target HTTP requests corresponding to a same combination of source address and URL reaches a third threshold, discard a target HTTP request, corresponding to the same combination of source address and URL, received after the number of target HTTP requests corresponding to the same combination of source address and URL reaches the third threshold.

15. The system according to claim 14, wherein the verifying unit is further configured to:
- transmit the same combination of source address and URL to the protection device to allow the protection device to discard the target HTTP request, corresponding to the same combination of source address and URL, received after the number of target HTTP requests corresponding to the same combination of source address and URL reaches the third threshold.

16. The system according to claim 10, wherein the verifying unit is further configured to:

when the target HTTP request is an HTTP request carried by a single data packet, determine that the target HTTP request is a legitimate request; and when the target HTTP request is an HTTP request that is carried by a plurality of data packets, determine whether the target HTTP request includes verification information, if the target HTTP request includes the verification information, verify whether the verification information is correct, and if the target request does not include the verification information, transmit the verification information to a client terminal that transmits the target HTTP request.

17. The system according to claim 16, wherein:

the receiving unit is further configured to:

receive one or more data packets carrying the target HTTP request, and parse the one or more data packets to obtain the target HTTP request, and when the one or more data packets carrying the target HTTP request is a single data packet, use an identifier to mark the target HTTP request; and the verifying unit is further configured to:

when the target HTTP request includes the identifier, determine that the target HTTP request is a legitimate request, and when the target HTTP request does not include the identifier, determine whether the target HTTP request includes the verification information, if the target HTTP request includes the verification information, verify whether the verification information is correct, and if the target HTTP request does not include the verification information, transmit the verification information to the client terminal that transmits the target HTTP request.

18. A server, comprising a processor and a memory, wherein the memory stores at least one instruction, at least one program, a code set, or an instruction set, that is loaded and executed by the processor to implement a method for defending an HTTP flood attack, and method includes:

determining a number of HTTP requests, transmitted by a protection device, received within each monitored time interval, wherein the HTTP requests include HTTP requests carried by a single data packet and HTTP requests carried by a plurality of data packets, and the HTTP requests carried by a single data packet are verified by the protection device;

verifying a target HTTP request after the number of HTTP requests received within any monitored time interval reaches a first threshold, wherein the target HTTP request includes an HTTP request received after the number of HTTP requests received within any monitored time interval reaches the first threshold, the target HTTP request is an HTTP request reassembled from a plurality of data packets or an incomplete HTTP request included merely in a single data packet and the target HTTP request is an HTTP request that cannot be verified by the protection device; and responding to a verified target HTTP request.

* * * * *